Aug. 16, 1927.

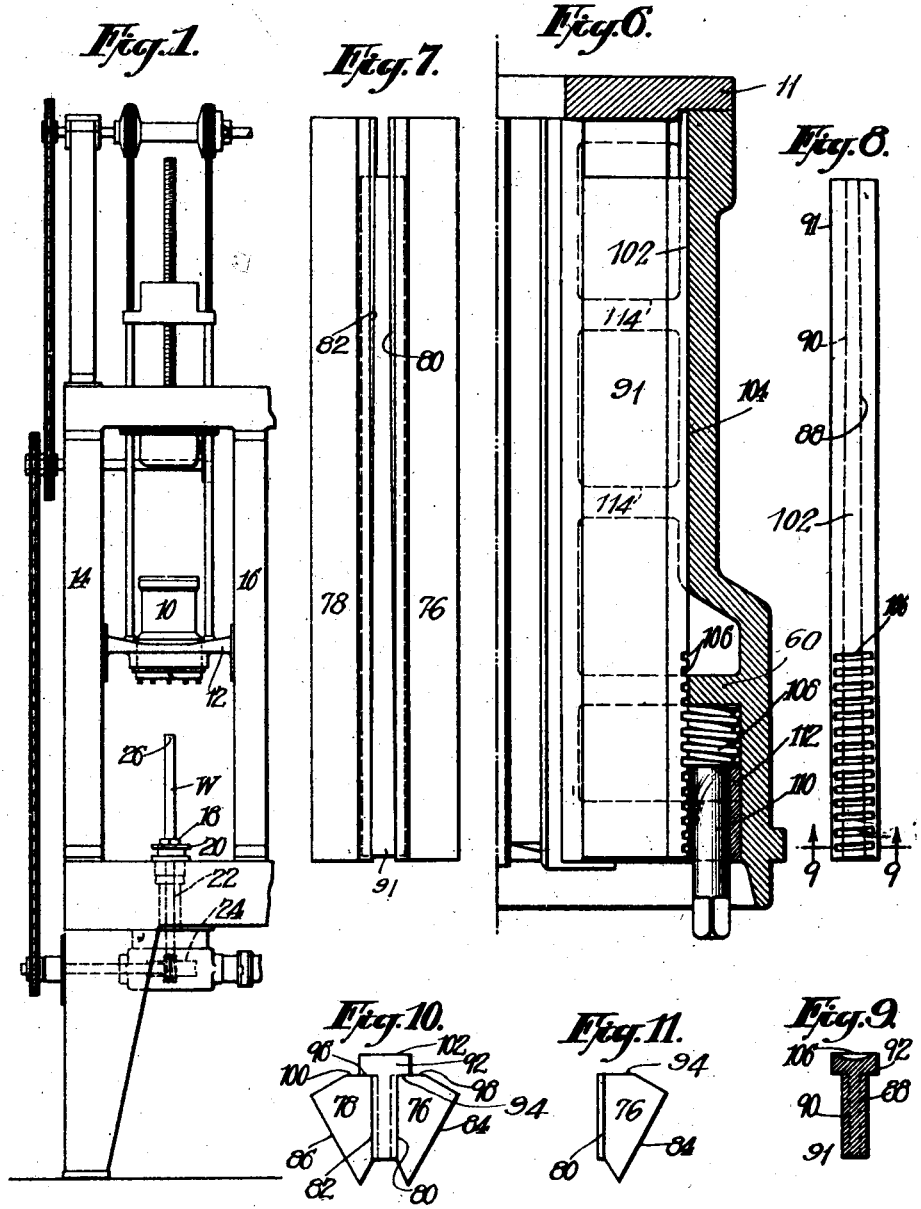

J. A. EDEN, JR 1,639,028

CUTTER HEAD

Filed April 25, 1924

INVENTOR
JAMES A. EDEN, JR.
BY
ATTORNEY

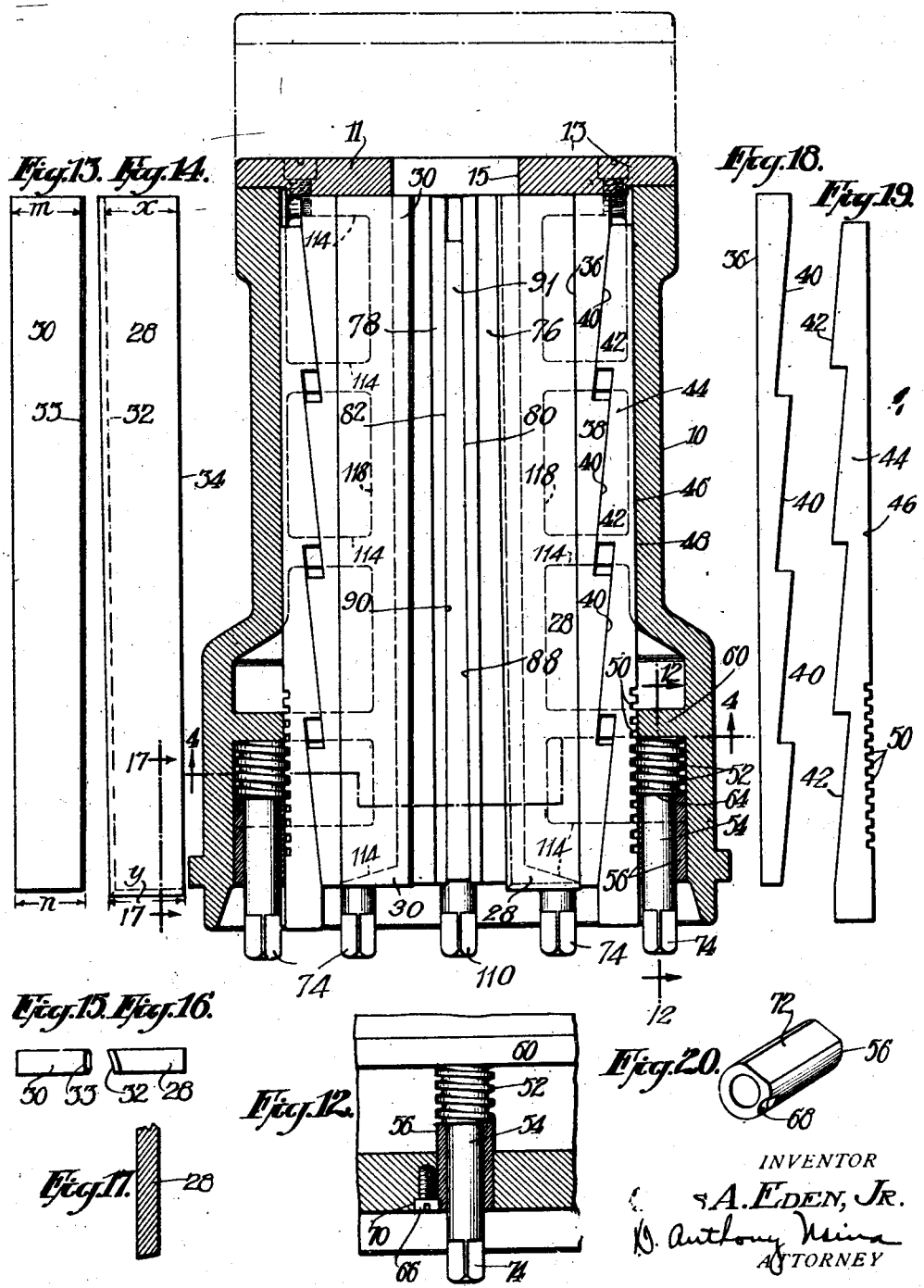

Patented Aug. 16, 1927.

1,639,028

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

CUTTER HEAD.

Application filed April 25, 1924. Serial No. 708,840.

This invention aims to provide a cutter-head having improved means for adjusting the blades and guides thereof and also improved means for rigidly clamping the blades and guides to the head so that they will not be displaced by the influence of the forces exerted in cutting the work.

An embodiment of the invention is illustrated in the accompanying drawings in which Fig. 1 is a diagrammatic view on a small scale showing my improved cutter-head mounted on a vertically adjustable carriage of a bolt turning machine;

Fig. 2 is an inverted plan of the head;

Fig. 3 is a longitudinal section thereof on line 3—3 of Fig. 2;

Fig. 4 is a horizontal section on line 4—4 of Fig. 3;

Fig. 5 is a fragmentary plan of the cutter-head casting, parts shown in Fig. 2 being omitted in the interest of clearness;

Fig. 6 is a fragmentary section on line 6—6 of Fig. 2;

Fig. 7 is a front view of a pair of clamp blocks and a coacting clamp wedge shown in Fig. 6;

Fig. 8 is a detail view of a clamping wedge;

Fig. 9 is a section thereof on line 9—9 of Fig. 8;

Fig. 10 is an underside plan of parts shown in Fig. 7;

Fig. 11 is a detail plan of a clamp block;

Fig. 12 is a section on line 12—12 of Fig. 3;

Figs. 13 to 17 inclusive are detail views of a guide and a cutter-blade, Figs. 15 and 16 being inverted plans of Figs. 13 and 14 and Fig. 17 being a detail section on line 17—17 of Fig. 14;

Figs. 18 and 19 are detail views of a pair of coacting wedges;

Fig. 20 is a detail perspective of a bearing for an adjusting screw.

Referring to the embodiment of the invention illustrated, the cutter-head represented as a whole by numeral 10 may be mounted in either a vertical position as shown or in a horizontal position or in an inclined position if desired or for some classes of work the head may be mounted in an upright position reverse to that shown in the drawings.

As illustrated in Fig. 1 the head 10 is secured to the vertically adjustable carriage 12 which is guided in suitable ways formed in the uprights 14 and 16. The work $w$ illustrated is a long bolt whose head 18 engages a chuck 20 which is rotated in any suitable manner as for example by a spindle 22 driven by a worm wheel 24. The bolt $w$ shown in the drawings is tapered slightly from the head 18 toward the opposite end 26. For turning such tapered work, I provide tapered blades 28 and tapered guides 30 shown in detail in Figs. 13 and 14. The blade 28 is wider at one end as indicated by the dimension line $x$ than it is at the opposite end indicated by dimension line $y$ and the guides 30 are each wider at one end as indicated by dimension $m$ than at the other end indicated by dimension $n$, the cutting edge 32 being slightly inclined from the vertical and the guiding edge 33 being oppositely inclined to the same degree. The head is provided with a plurality of cutter-blades 28 and a plurality of work engaging guides 30. In the head illustrated there are three such blades and three guides, one guide being located diametrically opposite each blade. The construction and mounting for the several blades is the same and the construction and mounting for the several guides is the same, therefore, a description of one set will suffice for all. The design is such that each blade can be individually adjusted and improved means are provided whereby the latter can be rigidly clamped in their adjusted positions. The arrangement is such that one set can be clamped in position without affecting the setting of the other sets. The rear edge 34 of each blade is truly vertical and adapted to contact with the straight edge 36 of a wedge member 38 having a number of wedge portions 40 which bear against similar wedge portions 42 on a coacting wedge member 44 whose rear face 46 bears on a flat machined seat 48 formed in the cutter-head. The surface 48 is parallel with the rear surface 34 of the blade while the cutting edge 32 of the blade is at a slight angle thereto so as to produce a tapered cut. It is to be understood, of course, that for some classes of work the cutting edge 32 may be parallel with the axis of the cutter-head for cutting or turning true cylindrical work.

While I have referred to the surface 34 as being truly vertical, of course, it is to be understood that the head may be used in a horizontal as well as vertical position.

At one end the wedge member 44 has a number of teeth 50 cut therein for cooperation with the threads 52 of an adjusting screw whose shank 54 is rotatably mounted in a bushing or bearing 56 which is fitted in a socket or counterbore 58 formed in the cutter-head casing. One end of the screw bears against an annular flange 60 extending inward from the cylindrical portion 62 of the shell of the cutter-head. A shoulder 64 is formed on the screw and bears against the top surface of the bearing 56. The latter is held in place in the cutter-head and prevented from turning by means of a key screw 66 the head of which engages a notch 68 formed in the cylindrical wall of the bearing. The cutter-head is provided with a counterbore 70 to accommodate the head of the screw 66. The bearing 56 is flattened off at 72 and forms a guiding surface for the lower end of the wedge member 44. The adjusting screws 54 are squared off as at 74 to permit manipulation thereof either by wrench or special adjusting tool. It is clear that turning the screw 54 will move one of the wedge members relatively to the other and that by reason of the engagement of their inclined surfaces will cause the blade 28 to be moved toward the work or toward the axis of the cutter-head. By providing the wedge members with a multiplicity of coacting tapered surfaces a much wider range of adjustment can be secured than would be possible if the tapered coacting wedge surface ran from one end of the wedge member to the other without being stepped or interrupted as shown.

The cutter-head shown is adapted for turning a bolt approximately twelve inches long but will be made in several different sizes for commercial use to machine bolts of different lengths. The length of the head will correspond approximately to the length of the bolt and the length of the other parts, namely, the blades, guides and wedges will be correspondingly increased in length for longer bolts. The dotted lines in Fig. 3 indicate a head of longer dimension adapted for use on a larger size bolt. Each cutter-head, of course, will be capable of working on bolts within a wide range of diameters because of the adjustability of the cutters and guides as will be understood.

The radial adjustment of the work engaging guides 30 is effected by coacting wedge members of identically the same construction as those described for adjusting the blades. The construction and operation of these parts will, therefore, not be repeated. Such duplication makes various parts interchangeable and enables manufacturing economies which will be readily appreciated by those skilled in the art.

Improved means are provided for locking or clamping the cutter-blades and guide members in their respective adjusted positions. The parts are arranged in pairs each pair including a guide and a cutter-blade and means are provided whereby the tightening of a single clamp screw will rigidly secure both the cutter-blade and guide member in their adjusted positions. These means include a pair of clamp blocks 76 and 78 which engage respectively a flat side face of the blade 28 and a guide 30 as well as the side face of the adjusting wedges which move the blade and guide.

The clamp blocks are substantially of triangular shape in plan as shown in Figs. 10 and 11. They are each provided with a tapered face, the tapered portion of the block 76 being indicated at 80 and a similar portion of the block 78 being indicated at 82. The tapers 80 and 82, as best shown in Fig. 7, are inclined oppositely or in other words their opposed faces converge toward one another. The faces 84 and 86 of the clamp blocks bear against the flat side faces of the blade and guide respectively. Coacting with the tapered faces 80 and 82 of the clamp blocks is a clamp wedge 91 having surfaces 88 and 90 which converge toward one another to form a wedge for coaction with the tapered faces 80 and 82 respectively of the clamp blocks 76 and 78. This wedge member is provided with a T-head 92 having shoulders 94 and 96 which engage the rear surfaces 98 and 100 of the clamp blocks 76 and 78. The outer surface 102 of the T-head is seated against a bearing surface 104 formed in the cutter-head. Near one end this wedge member 91 is provided with a series of teeth 106 for engagement with the threads 108 of an adjusting screw 110 which is carried in a bearing 112. The adjusting screw 110 and bearing 112 are duplicates of the parts used for adjusting the cutting blade and guide previously described. Turning the screw 110 will cause a longitudinal movement of the wedge member 91. This will exert a pressure on the clamp blocks 76 and 78 which in turn will transmit the pressure to the blade and guide respectively in a direction which is substantially normal or perpendicular to the side faces of said members thus clamping them securely against the integral segments 114 of the cutter-head. These segments, as shown in Figs. 2 and 4, are integral with radial ribs 116 which extend inwardly from the cylindrical shell 62 of the head. The inner ends of the radial ribs 116 terminate in arcuate segmental flanges 118 which, as shown in dotted lines in Fig. 3, extend longitudinally for practically the full length of the cutter-head.

The segments 114, flanges 118 and radial ribs 116 form a rigid support of light construction against which the blades and adjustable guides can be clamped.

As shown in the drawings, the blades and guides are arranged in pairs each pair comprising one blade and one guide. Each pair of elements can be individually adjusted to the proper position and then clamped in such position by turning up the screw 110 which will wedge the parts firmly against the corresponding integral segments 114. It is thus apparent that the various pairs can be individually adjusted and clamped in their adjusted position without interference because of the absolute integrality of the segments. When the wedge member 44 is adjusted longitudinally, it has a tendency to move the wedge member 38 endwise as well as radially. The end thrust, however, is taken by a plate 11 secured by screws 13 to the cutter-head. This plate has a central aperture 15 to permit the work to extend therethrough.

The segments 114 above referred to connect flanged extensions 118 of the ribs 116 with the outer shell of the head. As shown in Figs. 3 and 6 these segments are spaced apart in a vertical plane so that they occur at regular intervals. The uppermost segment 114 forms bearings for the guides and blades at their extreme ends. The head is designed so that it can be utilized for cutting bolts of varying lengths. As above stated the length of the head will extend approximately with the length of the bolt operated upon. By spacing the segments 114 at regular intervals which correspond approximately with the increments in which the length of the bolts vary, the cutter-head and size corresponding to a given length of bolt can be obtained by cutting the end of the casting off on a line flush with the top of the segments at a selected elevation. The wedge members are proportioned with respect to the longitudinal spacing between the segments 114 and therefore these members may also be cut off to correspond with the various lengths of bolts. This design permits manufacturing economies it being appreciated that various lengths of cutter-heads for operation on bolts of different lengths can be secured from the same design by merely terminating the head in alignment with the segments 114 at various elevations and making blades, guides and adjusting wedges of the corresponding length.

Though I have described with great particularity the details of the embodiment of the invention illustrated, it is not to be construed that I am limited thereto as changes in arrangement and substitution of equivalents may be made by those skilled in the art without departing from the invention as defined in the appended claims.

What I claim is:—

1. A cutter-head including a plurality of integral skeletonized segments, cutter-blades and guides arranged in pairs seated against said segments and means for exerting a pressure in a direction substantially normal to said blades and guides for securely clamping them against said segments whereby each pair can be secured in position independently because of the integrality of said segments.

2. A cutter-head comprising a shell having inwardly extending ribs and flanges to form rigid integral skeletonized supporting segments, adjustable work engaging members seated against said segments and means for exerting a pressure on said members in a direction substantially normal to their faces to clamp them against said segments.

3. A cutter-head comprising a shell having inwardly extending ribs and flanges to form rigid integral supporting segments, a cutter-blade, and a work engaging guide seated against said segments, clamp blocks engaging the flat side faces of said blade and guide and a wedge coacting with said clamp blocks to rigidly hold the blade and guide in position.

4. A cutter-head comprising a shell having inwardly extending ribs and flanges to form rigid integral supporting segments, a cutter-blade, and a work engaging guide seated against said segments, clamp blocks engaging the flat side faces of said blade and guide and a wedge coacting with said clamp blocks to rigidly hold the blade and guide in position and a screw for moving and locking said wedge.

5. In combination with a cutter-head, an inwardly extending blade and a work engaging guide seated against an integral portion of said head, separate means for adjusting said blade and guide toward the central axis of the cutter-head including longitudinally movable members having wedge surfaces, clamp blocks engaging said blade and guide, a wedge member between said clamp blocks and means for forcibly moving said wedge member longitudinally of the cutter-head to rigidly clamp said blade and guide to the cutter-head in their respective adjusted positions.

6. In a cutter-head having a long blade extending longitudinally thereof, means for adjusting said blade toward the work comprising a wedge member having teeth cut in one face thereof, an adjusting screw engaging said teeth and a bearing for said screw detachably secured to the cutter-head.

7. A cutter-head having an adjustable cutter-blade and an adjustable work engaging guide, a clamp screw and means operatively associated therewith whereby both the blade and guide are securely clamped to the head by the movement of said screw.

8. A cutter-head comprising a shell having inwardly extending ribs and flanges to form rigid integral supporting segments, the flanges being formed at spaced intervals in the length of the head and being adapted to form supports for the ends of cutter-blades and guides for heads of different lengths.

9. A cutter-head having skeletonized supporting segments located at spaced intervals in its length, cutter-blades and guides seated against said segments, and multiple adjusting wedges, the cutter-head being designed to accommodate bolts of different lengths by terminating the head in the plane of segments at a selected position in its length, the lengths of the individual adjusting wedges being commensurate with the length of the cutter-head.

In witness whereof, I have hereunto signed my name.

JAMES A. EDEN, Jr.